United States Patent
Hou et al.

(10) Patent No.: US 9,716,438 B2
(45) Date of Patent: Jul. 25, 2017

(54) INTEGRATED CIRCUIT THAT CONTROLS SWITCH POWER SUPPLY AND SWITCH POWER SUPPLY

(71) Applicant: BYD Company Limited, Shenzhen (CN)

(72) Inventors: Yongjun Hou, Shenzhen (CN); Wenhui Ye, Shenzhen (CN); Haiquan Zhang, Shenzhen (CN)

(73) Assignee: BYD Company Limited (CN)

( * ) Notice: Subject to any disclaimer, the term of this patent is extended or adjusted under 35 U.S.C. 154(b) by 0 days.

(21) Appl. No.: 15/105,189

(22) PCT Filed: Dec. 19, 2014

(86) PCT No.: PCT/CN2014/094446
§ 371 (c)(1),
(2) Date: Jun. 16, 2016

(87) PCT Pub. No.: WO2015/090236
PCT Pub. Date: Jun. 25, 2015

(65) Prior Publication Data
US 2016/0322911 A1 Nov. 3, 2016

(30) Foreign Application Priority Data
Dec. 20, 2013 (CN) .......................... 2013 1 0712126

(51) Int. Cl.
*H02M 3/335* (2006.01)
*H02M 1/08* (2006.01)
*H02M 1/00* (2006.01)

(52) U.S. Cl.
CPC ......... *H02M 3/33523* (2013.01); *H02M 1/08* (2013.01); *H02M 3/335* (2013.01); *H02M 2001/0032* (2013.01); *Y02B 70/16* (2013.01)

(58) Field of Classification Search
CPC ..... H02M 3/335; H02M 3/33523; H02M 1/08
See application file for complete search history.

(56) References Cited

U.S. PATENT DOCUMENTS 5,517,397 A   5/1996 Quek et al.
9,413,252 B2* 8/2016 Xu .................... H02M 3/33523
(Continued)

FOREIGN PATENT DOCUMENTS

CN    101667019 A    3/2010
CN    103023330 A    4/2013
(Continued)

*Primary Examiner* — Gary L Laxton
*Assistant Examiner* — Lakaisha Jackson
(74) *Attorney, Agent, or Firm* — DLA Piper LLP (US)

(57) ABSTRACT

An integrated circuit controls a switch power supply including: a primary feedback terminal, a primary feedback sampling module, an error amplifying module, a first control module, a secondary control module, a secondary feedback terminal, a second control module, and a driving module; the second control module, connected with the first control module and the secondary control module, respectively, and configured to generate a logic control signal according to the constant voltage control signal, or according to the secondary control signal and the constant voltage control signal; and the driving module, connected with the second control module and configured to generate a driving signal according to the logic control signal and to output the driving signal.

15 Claims, 6 Drawing Sheets

(56) References Cited

U.S. PATENT DOCUMENTS

| | | | |
|---|---|---|---|
| 2009/0218999 A1 | 9/2009 | Kikuchi | |
| 2010/0208500 A1* | 8/2010 | Yan | H02M 3/33523 363/21.12 |
| 2010/0225293 A1* | 9/2010 | Wang | H02M 3/33507 323/290 |
| 2011/0317458 A1* | 12/2011 | Yang | H02M 3/33515 363/84 |
| 2012/0250366 A1 | 10/2012 | Wang et al. | |
| 2013/0027985 A1 | 1/2013 | Wang et al. | |
| 2013/0223108 A1* | 8/2013 | Xu | H02M 3/33507 363/21.17 |
| 2016/0301407 A1* | 10/2016 | Chen | H02M 1/08 |

FOREIGN PATENT DOCUMENTS

| | | |
|---|---|---|
| CN | 103051197 A | 4/2013 |
| JP | 09-172777 A | 6/1997 |

\* cited by examiner

INTEGRATED CIRCUIT THAT CONTROLS SWITCH POWER SUPPLY AND SWITCH POWER SUPPLY

CROSS REFERENCE TO RELATED APPLICATION

This application claims priority and benefits of CN 201310712126.7, filed Dec. 20, 2013, the entire content of which is incorporated herein by reference.

TECHNICAL FIELD

This disclosure generally relates to integrated circuits and, more particularly, to integrated circuits that control a switch power supply and a switch power supply.

BACKGROUND

A switch power supply is used to supply power to a mobile electronic device such as a cell phone and a laptop. The switch power supply has an advantage of small volume, high efficiency and high precision for a constant voltage and the like.

Nowadays, with the development of mobile electronic devices and more attention given to saving energy and protecting the environment, a higher requirement for performance (such as no-load power consumption and dynamic load response speed) of the switch power supply is proposed such that a continuous improvement on a constant voltage control mode for an integrated circuit of the switch power supply is conducted by developers to obtain a better constant voltage control mode to solve current problems of the switch power supply. The constant voltage control mode for the integrated circuit of the switch power supply includes a primary constant voltage control mode and a secondary constant voltage control mode.

Since there are some errors and limitations in taking a sample of an output voltage of the switch power supply coupled to a feedback winding in the primary constant voltage control mode, the current output voltage of the switch power supply cannot accurately be obtained in real time, such that the performance (such as the dynamic load response speed) of the switch power supply is poor in the primary constant voltage control mode and either the no-load power consumption or a no-load working frequency of the switch power supply in the primary constant voltage control mode cannot be controlled to be low. Furthermore, although the switch power supply has a good performance on the dynamic load response in the secondary constant voltage control mode, the power consumption is high caused by the fact that some feedback signals in the secondary constant voltage control mode are analog signals, and thus the no-load power consumption of the switch power supply in the secondary constant voltage control mode also cannot be controlled to be low.

SUMMARY

We provide an integrated circuit that controls a switch power supply including: a primary feedback terminal configured to receive a primary feedback voltage of the switch power supply; a primary feedback sampling module connected to the primary feedback terminal and configured to take a sample of the primary feedback voltage to generate a primary sampling voltage; an error amplifying module connected to the primary feedback sampling module and configured to amplify an error between the primary sampling voltage and a predetermined reference voltage to generate an error amplified signal; a first control module connected to the error amplifying module and configured to perform a pulse width modulation or/and a pulse frequency modulation according to the error amplified signal to generate a constant voltage control signal; a secondary feedback terminal configured to receive a secondary feedback current of the switch power supply; a secondary control module connected to the secondary feedback terminal and the error amplifying module, respectively, and configured to control the integrated circuit to enter a control mode comprising a primary constant voltage control mode and a secondary constant voltage control mode according to the error amplified signal and generate a secondary control signal according to the secondary feedback current if the integrated circuit is in the secondary constant voltage control mode; a second control module connected to the first control module and the secondary control module, respectively, and configured to generate a logic control signal according to the secondary control signal and the constant voltage control signal; and a driving module connected to the second control module and configured to generate a driving signal according to the logic control signal and to output the driving signal.

With the integrated circuit, the secondary control module can control the integrated circuit to enter the secondary constant voltage control mode if the integrated circuit is in a very light load or no-load situation, and control the integrated circuit to enter the primary constant voltage control mode if the integrated circuit is in a normal load or heavy load situation, thus a mixture control mode including the primary constant voltage control mode and the secondary constant voltage control mode may be realized in a full load situation. The integrated circuit provides an advantage to the primary constant voltage control mode and the secondary constant voltage control mode to obtain a better performance on the dynamic load response, a very low no-load working frequency and a very low no-load loss and to work stably.

We also provide a switch power supply including a transformer including a primary winding, a secondary winding and a feedback winding; a primary feedback dividing module connected to the feedback winding and configured to generate a primary feedback voltage according to a feedback voltage of the feedback winding; a secondary feedback comparing module connected to an output voltage of the switch power supply and configured to generate a secondary feedback current according to the output voltage of the switch power supply; a switch module having a first terminal, a second terminal and a control terminal in which the first terminal of the switch module connects to the primary winding; and the above integrated circuit, in which a primary feedback terminal of the integrated circuit connects to the primary feedback dividing module, a secondary feedback terminal of the integrated circuit connects to the secondary feedback comparing module, a signal output terminal of the integrated circuit connects to the control terminal of the switch module, the integrated circuit is configured to switch the switch module to on or off according the primary feedback voltage and the secondary feedback current to adjust the output voltage of the switch power supply.

With the switch power supply, by switching by the integrated circuit the switch module to on or off according the primary feedback voltage generated by the primary feedback dividing module and the secondary feedback current generated by the secondary feedback comparing module, the output voltage of the switch power supply may be maintained as a rated value such that the integrated circuit can obtain a better performance on the dynamic load response, a very low no-load working frequency and a very low no-load loss, and work stably.

Additional aspects and advantages will be given in part in the following description, become apparent in part from the following description, or be learned from the practice of the examples of the disclosure.

BRIEF DESCRIPTION OF THE DRAWINGS

These and other aspects and advantages will become apparent and more readily appreciated from the following descriptions made with reference to the accompanying drawings.

DETAILED DESCRIPTION

Reference will be made in detail to examples. Examples will be shown in drawings in which the same or similar elements and the elements having same or similar functions are denoted by like reference numerals throughout the descriptions. The examples described herein according to drawings are explanatory and illustrative, not construed to limit the present disclosure.

Various examples are provided in the following description to implement different structures of the present disclosure. Certain elements and settings will be described for the sake of simplicity. However, the elements and settings are only by way of example and are not intended to limit this disclosure. In addition, reference numerals may be repeated in different examples. This repeating is for the purpose of simplification and clarity and does not refer to relations between different examples and/or settings. Furthermore, examples of different processes and materials are provided herein. However, those skilled in the art will appreciate that other processes and/or materials may be also applied. Moreover, a structure in which a first feature is "on" a second feature may include an example in which the first feature directly contacts the second feature, and may also include an example in which an additional feature is formed between the first feature and the second feature so that the first feature does not directly contact the second feature.

Unless specified or limited otherwise, it should be noted that, terms "mounted," "connected," "connects: and "coupled" may be understood broadly such as electronic connections or mechanical connections, inner communications between two elements, direct connections or indirect connections through intervening structures, which can be understood by those skilled in the art according to specific situations.

With reference to the following descriptions and drawings, these and other aspects will become apparent. In the descriptions and drawings, some particular examples are described to show the principles of examples. However, it should be appreciated that the scope of examples is not limited herein. On the contrary, changes, alternatives, and modifications can be made in the examples without departing from spirit, principles and scope of the appended claims.

In the following, an integrated circuit that controls a switch power supply and a switch power supply are described in detail with reference to the drawings.

Figure 1:
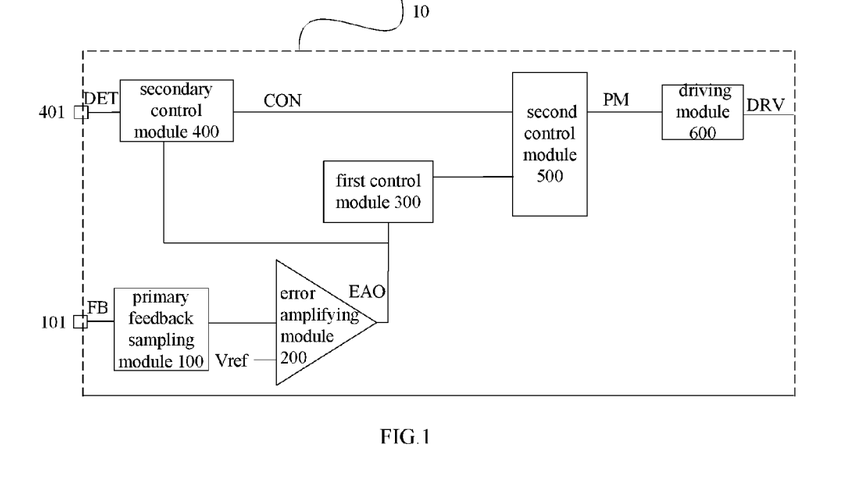
FIG. 1 is a schematic diagram of an integrated circuit according to a first example.

FIG. 1 is a schematic diagram of an integrated circuit according to a first example. As shown in FIG. 1, the integrated circuit 10 includes a primary feedback terminal 101, a primary feedback sampling module 100, an error amplifying module 200, a first control module 300, a secondary feedback terminal 401, a secondary control module 400, a second control module 500, and a driving module 600.

The primary feedback terminal 101 is configured to receive a primary feedback voltage FB of a switch power supply. The primary feedback sampling module 100 connects to the primary feedback terminal 101 and is configured to take a sample of the primary feedback voltage to generate a primary sampling voltage. The error amplifying module 200 connects to the primary feedback sampling module 100 and is configured to amplify an error between the primary sampling voltage and a predetermined reference voltage Vref to generate an error amplified signal EAO. The first control module 300 connects to the error amplifying module 200 and is configured to perform a pulse width modulation PWM or/and a pulse frequency modulation PFM according to the error amplified signal EAO to generate a constant voltage control signal. The secondary feedback terminal 401 is configured to receive a secondary feedback current DET of the switch power supply. The secondary control module 400 connects to the secondary feedback terminal 401 and the error amplifying module 200, respectively, and is configured to control the integrated circuit to enter a control mode according to the error amplified signal EAO. The control mode comprises a primary constant voltage control mode and a secondary constant voltage control mode. If the integrated circuit 10 is in the secondary constant voltage control mode, the secondary control module 400 is configured to generate a secondary control signal CON according to the secondary feedback current DET. The second control module 500 connects to the first control module 300 and the secondary control module 400, respectively, and is configured to generate a logic control signal PM according to the constant voltage control signal, or according to the secondary control signal CON and the constant voltage control signal. The driving module 600 connects to the second control module 500 and is configured to generate a driving signal according to the logic control signal PM and output the driving signal. Generally, since the primary feedback voltage FB is used to reflect changes of an output voltage of the switch power supply which the integrated circuit 10 belongs to and the output voltage of the switch power supply is proportional to a load of the switch power supply, the primary feedback voltage FB can reflect changes of the load of the switch power supply which the integrated circuit 10 belongs to, such that the error amplified signal EAO can reflect the changes of the load of the switch power supply which the integrated circuit 10 belongs to.

Figure 2:
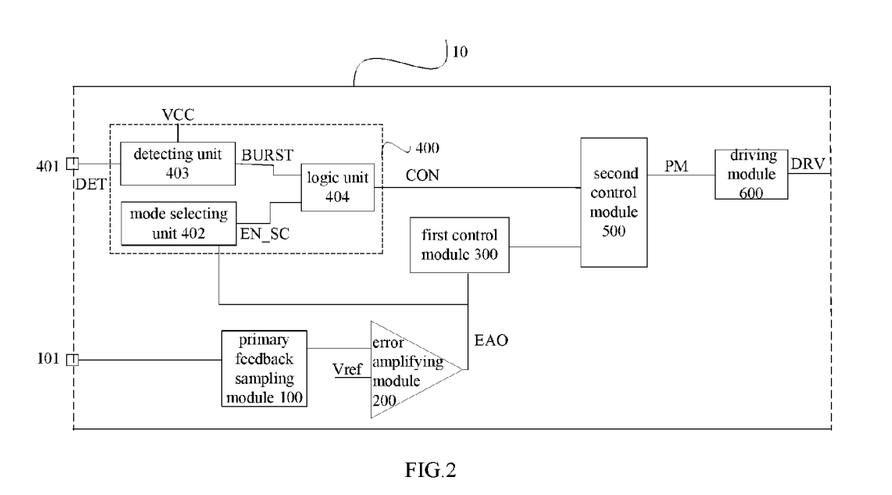
FIG. 2 is a schematic diagram of an integrated circuit according to a second example.

FIG. 2 is a schematic diagram of an integrated circuit according to a second example. As shown in FIG. 2, the secondary control module 400 includes a mode selecting unit 402, a detecting unit 403 and a logic unit 404. The mode selecting unit 402 connects to the error amplifying module 200 and is configured to output a secondary mode selection signal EN_SC to control the integrated circuit 10 to enter the secondary constant voltage control mode if the error amplified signal EAO is less than a first reference voltage V1. In other words, if the integrated circuit 10 works in a very light load or no-load situation, the mode selecting unit 402 outputs the secondary mode selection signal EN_SC to control the integrated circuit 10 to enter the secondary constant voltage control mode. The detecting unit 403 connects to the secondary feedback terminal 401 and a first voltage source VCC of the integrated circuit 10, respectively, and is configured to take a sample of the secondary feedback current and generate a logic voltage signal BURST according to an output voltage of the first voltage source VCC and the secondary feedback current DET. In other words, the logic voltage signal BURST can reflect changes of the secondary feedback current DET. The logic unit 404 connects to the mode selecting unit 402 and the detecting unit 403, respectively, and is configured to generate the secondary control signal CON according to the logic voltage signal BURST if the control integrated circuit 10 is in the secondary constant voltage control mode, in other words, the logic unit 404 generates the secondary control signal CON according to the logic voltage signal BURST and the secondary mode selection signal EN_SC. That is, the premise of generating the secondary control signal CON is that the integrated circuit 10 works in a very light load or no-load situation. At this time, the mode selecting unit 402 outputs the secondary mode selection signal EN_SC, and then the logic unit 404 generates the secondary control signal CON. Generally, each of the secondary feedback current DET, the logic voltage signal BURST, the secondary mode selection signal EN_SC, and the secondary control signal CON is a digital signal. Thus, if the integrated circuit 10 is in the secondary constant voltage control mode, i.e., if the integrated circuit 10 works in a very light load or no-load situation, the integrated circuit 10 has a low no-load working frequency and a low power consumption. In addition, the secondary constant voltage control mode is used in a very light load or no-load situation to ensure that the integrated circuit 10 has a better performance on the dynamic load response.

The mode selecting unit 402 may further be configured to control the integrated circuit 10 to enter the primary constant voltage control mode if the error amplified signal EAO is greater than a second reference voltage V2.

Figure 3:
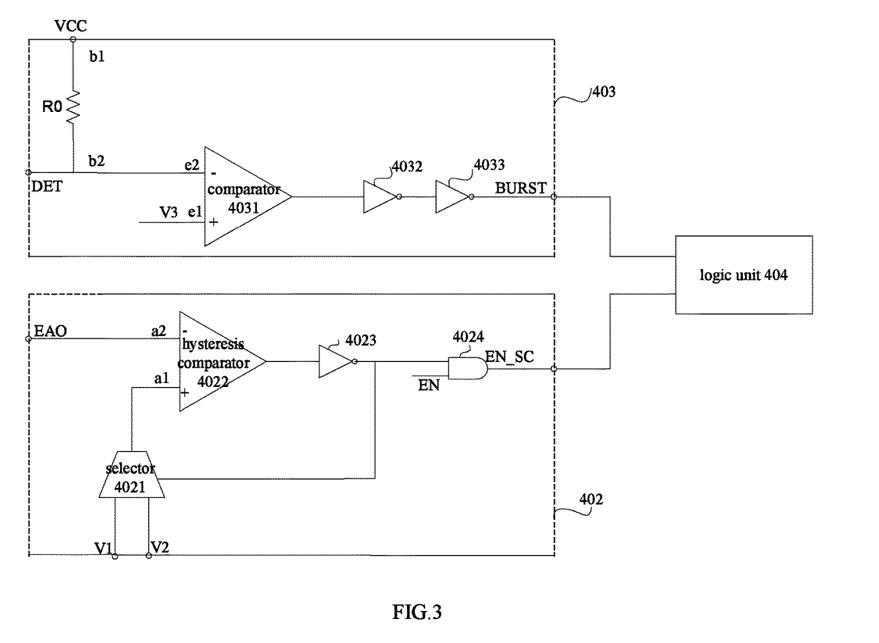
FIG. 3 is a schematic diagram of a secondary control module of an integrated circuit according to an example.

FIG. 3 is a schematic diagram of a secondary control module of an integrated circuit according to an example. As shown in FIG. 3, the mode selecting unit 402 includes a selector 4021, a hysteresis comparator 4022, a first inverter 4023 and an AND gate 4024. The selector 4021 connects to the first reference voltage V1, the second reference voltage V2 and a first inversion signal, respectively, and is configured to select the first reference voltage V1 or the second reference voltage V2 to generate a selection signal according to the first inversion signal. In other words, the selection signal is the first reference voltage V1 or the second reference voltage V2. The hysteresis comparator 4022 has an anode a1 connected to the selector 4021 and a cathode a2 connected to the error amplifying module 200, and is configured to compare the selection signal to the error amplified signal EAO to generate a hysteresis comparison signal. The first inverter 4023 connects to the hysteresis comparator 4022 and is configured to invert the hysteresis comparison signal to generate the first inversion signal. The AND gate 4024 connects to the first inverter 4023 and a predetermined enable signal EN respectively and is configured to perform a logical "AND" calculation on the first inversion signal and the predetermined enable signal EN to output the secondary mode selection signal EN_SC to the integrated circuit. Generally, when the load increases and the error amplified signal EAO is greater than the second reference voltage V2, i.e., the integrated circuit 10 works in a normal load or heavy load situation, the mode selecting unit 402 controls the integrated circuit 10 to enter the primary constant voltage control mode from the secondary constant voltage control mode. A difference between the second reference voltage V2 and the first reference voltage V1 is used as a conversion hysteresis voltage range of the control mode between the primary constant voltage control mode and the secondary constant voltage control mode. With the conversion hysteresis voltage range, the integrated circuit 10 can convert the control mode stably to obtain a better performance on the dynamic load response. That is, if the integrated circuit 10 works in a normal load or heavy load situation, the integrated circuit 10 is controlled to enter the primary constant voltage control mode to avoid losses due to the secondary constant voltage control mode of the integrated circuit 10.

As shown in FIG. 3, the detecting unit 403 includes a first resistor R0, a comparator 4031, a second inverter 4032, and a third inverter 4033. The first resistor R0 has a first terminal b1 connected to the first voltage source VCC of the integrated circuit 10 and a second terminal b2 connected to the secondary feedback terminal 401, i.e., the second terminal b2 receives the secondary feedback current DET. The comparator 4031 has an anode e1 connected to a third reference voltage V3 and a cathode e2 connected to the second terminal b2 of the first resistor R0 and is configured to compare the third reference voltage V3 with a cathode voltage of the comparator 4031 to generate a comparison signal. The second inverter 4032 connects to the comparator 4031, and is configured to invert the comparison signal to generate a second inversion signal. The third inverter 4033 connects to the second inverter 4032 and is configured to invert the second inversion signal to generate the logic voltage signal BURST. Specifically, a current comparison signal is generated by comparing a current source generated by the first voltage source VCC of the integrated circuit 10 according to the first resistor R0 with the secondary feedback current DET, the current comparison signal is used as the cathode voltage of the comparator 4031. The comparator 4031 compares the third reference voltage V3 with the cathode voltage to generate the comparison signal and outputs the comparison signal to the second inverter 4032, and then the logic voltage signal BURST is obtained by processing the comparison signal by the second inverter 4032 and the third inverter 4033.

The first control module 300 may further be configured to generate an overcurrent reference signal Ics according to the error amplified signal EAO.

Figure 4:
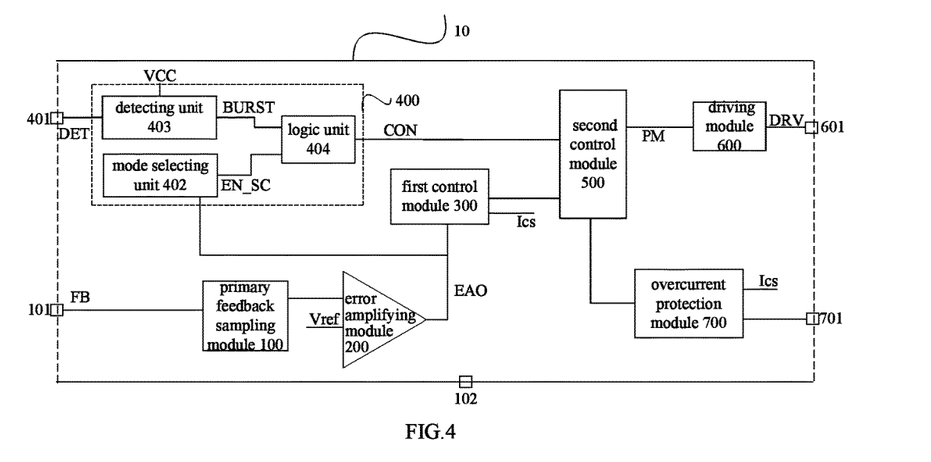
FIG. 4 is a schematic diagram of an integrated circuit according to a third example.

FIG. 4 is a schematic diagram of an integrated circuit according to a third example. As shown in FIG. 4, the integrated circuit 10 further includes an overcurrent protection module 700 and an overcurrent terminal 701. The overcurrent terminal 701 is configured to receive a primary side overcurrent voltage signal of the switch power supply. The overcurrent protection module 700 connects to the overcurrent terminal 701, the first control module 300 and the second control module 500, respectively, and is configured to compare the overcurrent reference signal Ics to the primary side overcurrent voltage signal to generate a closing signal. The second control module 500 is further configured to generate the logic control signal PM according to the secondary control signal CON, the closing signal and the constant voltage control signal, or according to the constant voltage control signal and the closing signal. In other words, if the integrated circuit 10 is controlled to enter the primary constant voltage control mode, the integrated circuit 10 takes a sample of the primary feedback voltage FB and the primary side overcurrent voltage signal, at this time, the second control module 500 outputs the logic control signal PM according to the constant voltage control signal and the closing signal, and then the driving module 600, connected to a signal output terminal 601 of the integrated circuit 10, outputs the driving signal DRV according to the logic control signal PM. If the integrated circuit 10 is controlled to enter the secondary constant voltage control mode, the integrated circuit 10 takes a sample of the primary feedback voltage FB, the secondary feedback current DET and the primary side overcurrent voltage signal, at this time, the second control module 500 outputs the logic control signal PM according to the secondary control signal CON, the constant voltage control signal and the closing signal, and then the driving module 600 outputs the driving signal DRV to turn on or off the switch tube T0 according to the logic control signal PM.

As shown in FIG. 4, the integrated circuit 10 may further include a ground terminal 102. The ground terminal 102 is grounded.

Figure 5:
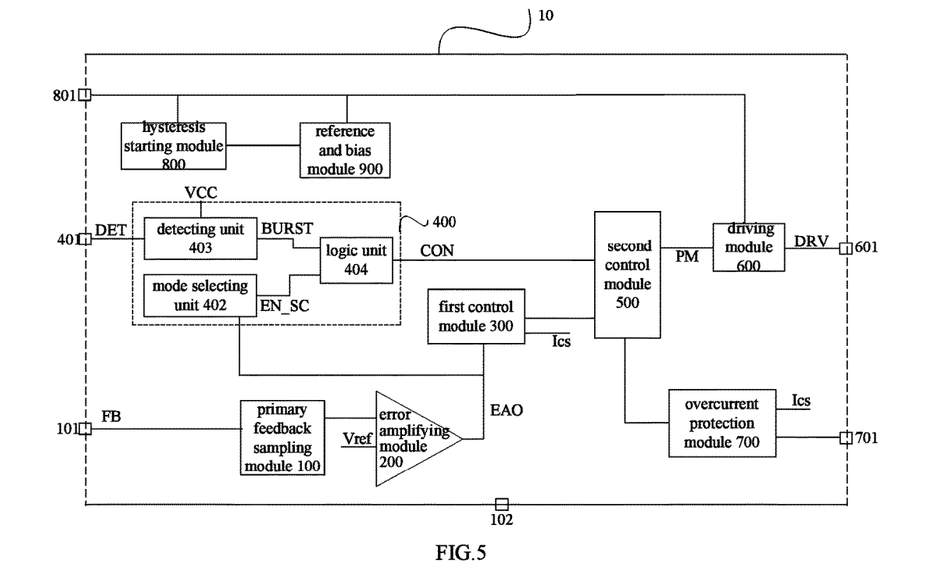
FIG. 5 is a schematic diagram of an integrated circuit according to a fourth example.

FIG. 5 is a schematic diagram of an integrated circuit according to a fourth example. As shown in FIG. 5, the integrated circuit 10 further includes a power supply terminal 801, a hysteresis starting module 800 and a reference and bias module 900. The power supply terminal 801 is configured to receive a working voltage of the integrated circuit. The hysteresis starting module 800, connected to the power supply terminal 801, is configured to generate a hysteresis voltage signal according to the working voltage. The reference and bias module 900, connected to the power supply terminal 801 and the hysteresis starting module 800 respectively, is configured to generate a bias signal, the predetermined reference voltage Vref, the first reference voltage V1, the second reference voltage V2 and the third reference voltage V3 according to the hysteresis voltage signal. As shown in FIG. 5, the power supply terminal 801, connected with the driving module 600, provides the working voltage to the driving module 600. The first voltage source VCC can be provided by the hysteresis starting module 800 or the reference and bias module 900.

With the integrated circuits, the secondary control module 400 can control the integrated circuit 10 to enter the secondary constant voltage control mode if the integrated circuit 10 is in a very light load or no-load situation, and control the integrated circuit 10 to enter the primary constant voltage control mode if the integrated circuit is in a normal load or heavy load situation. Thus, a mixture control mode including the primary constant voltage control mode and the secondary constant voltage control mode may be realized in a full load situation. The integrated circuit 10 plays an advantage of the primary constant voltage control mode and the secondary constant voltage control mode to obtain a better performance on the dynamic load response, a very low no-load working frequency and a very low no-load loss and to work stably.

Figure 6:
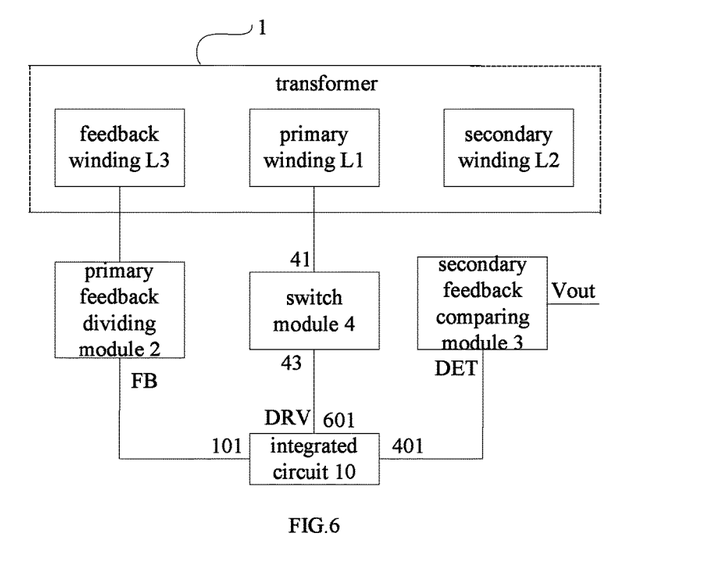
FIG. 6 is a block diagram of a switch power supply according to a first example.

FIG. 6 is a block diagram of a switch power supply according to a first example. As shown in FIG. 6, the switch power supply includes a transformer 1, a primary feedback dividing module 2, a secondary feedback comparing module 3, a switch module 4 and the above integrated circuit 10. The transformer 1 includes a primary winding L1, a secondary winding L2 and a feedback winding L3. The primary feedback dividing module 2 connects to the feedback winding L3 and is configured to generate a primary feedback voltage FB according to a feedback voltage of the feedback winding L3. The secondary feedback comparing module 3 connects to an output voltage Vout of the switch power supply and is configured to generate a secondary feedback current DET according to the output voltage Vout of the switch power supply. The switch module 4 has a first terminal 41 and a control terminal 43. The first terminal 41 of the switch module 4 connects to the primary winding L1. A primary feedback terminal 101 of the integrated circuit 10 connects to the primary feedback dividing module 2, a secondary feedback terminal 401 of the integrated circuit 10 connects to the secondary feedback comparing module 3, and the signal output terminal 601 of the integrated circuit 10 connects to the control terminal 43 of the switch module 4. The integrated circuit 10 is configured to switch the switch module 4 on or off according the primary feedback voltage FB and the secondary feedback current DET to adjust the output voltage Vout of the switch power supply.

Figure 7:
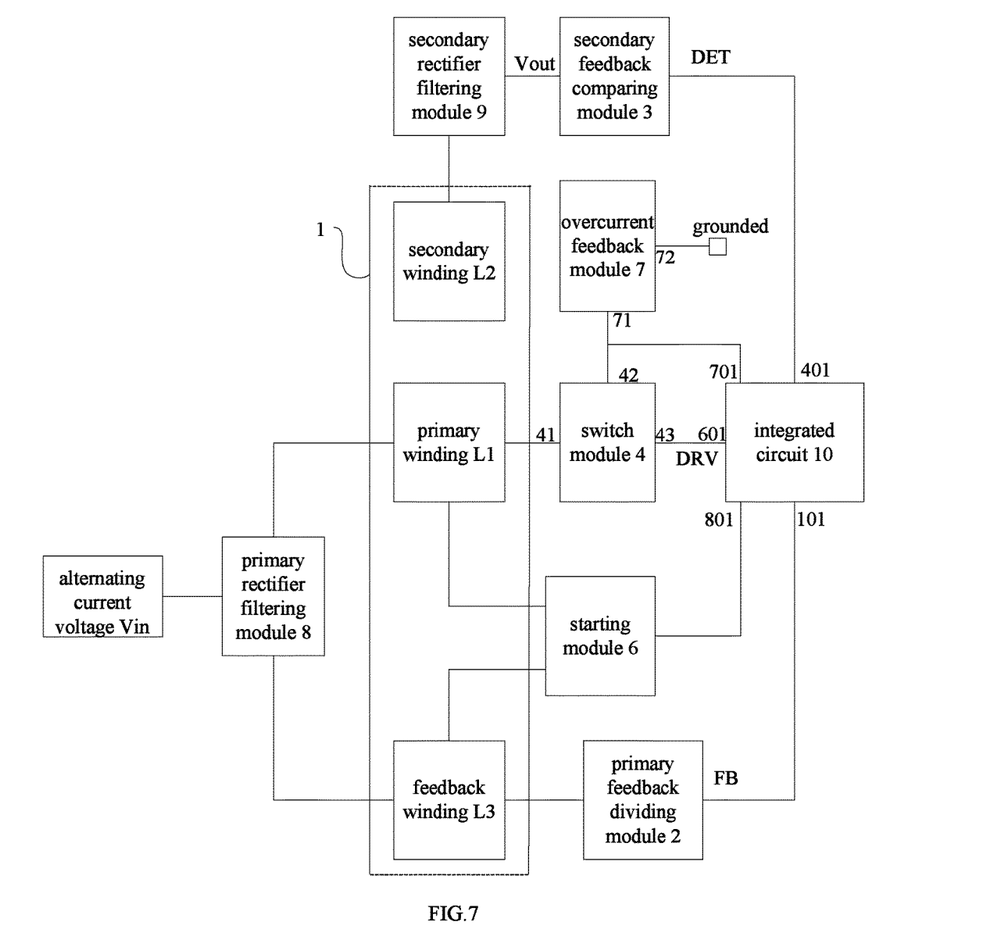
FIG. 7 is a block diagram of a switch power supply according to a second example.

FIG. 7 is a block diagram of a switch power supply according to a second example. As shown in FIG. 7, the switch power supply further includes a starting module 6 and an overcurrent feedback module 7. The starting module 6 connect to the primary winding L1, the feedback winding L3 and the integrated circuit 10, respectively, and is configured to control the integrated circuit 10 to start to work according to an input voltage of the primary winding L1 and the feedback voltage of the feedback winding L3. In other words, the starting module 6 generates a starting voltage to control the integrated circuit 10 to start to work according to the input voltage of the primary winding L1 and the feedback voltage of the feedback winding L3. The overcurrent feedback module 7 has a first terminal 71 and a second terminal 72. The switch module 4 further has a second terminal 42. The first terminal 71 of the overcurrent feedback module 7 connects to the second terminal 42 of the switch module 4 and an overcurrent terminal 701 of the integrated circuit 10, respectively, the second terminal 72 of the overcurrent feedback module 7 is grounded. The overcurrent feedback module 7 is configured to generate a primary side overcurrent voltage signal according to an output signal of the switch module 4 and output the primary side overcurrent voltage signal to the overcurrent terminal 701 of the integrated circuit 10. As shown in FIG. 7, the switch power supply further includes a primary rectifier filtering module 8 and a secondary rectifier filtering module 9. The primary rectifier filtering module 8 connects to an alternating current voltage Vin, the primary winding L1 and the feedback winding L3, respectively, and is configured to rectify and filter the alternating current voltage Vin to generate a primary direct current voltage and output the primary direct current voltage to the primary winding L1 and the feedback winding L3, respectively. The secondary rectifier filtering module 9 connects to the secondary winding L2, and is configured to rectify and filter a secondary voltage of the secondary winding L2 to generate the output voltage Vout of the switch power supply.

Figure 8:
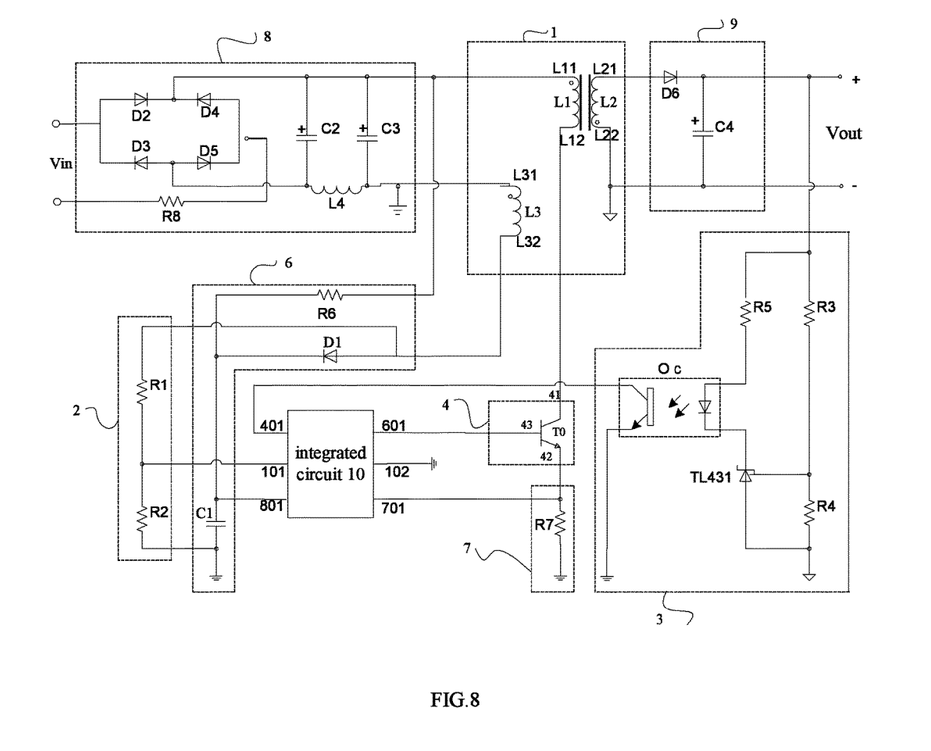
FIG. 8 is a circuit diagram of a switch power supply according to a third example.

FIG. 8 is a circuit diagram of a switch power supply according to a third example. As shown in FIG. 8, the primary feedback dividing module 2 includes a second resistor R1 and a third resistor R2. A first terminal of the second resistor R1 connects to a dotted terminal L32 of the feedback winding L3. A second terminal of the second resistor R1 connects to a first terminal of the third resistor R2 and the primary feedback terminal 101 of the integrated circuit 10, respectively, a second terminal of the third resistor R2 is grounded. The first terminal of the second resistor R1 may connect to a synonyms terminal L31 of the feedback winding L3. The secondary feedback comparing module 3 includes a fourth resistor R3, a fifth resistor R4, a sixth resistor R5, a second voltage source TL431, and an optocoupler Oc. A first terminal of the fourth resistor R3 connects to a high level end of the output voltage Vout of the switch power supply and a first terminal of the sixth resistor R5, respectively, a second terminal of the fourth resistor R3 connects to a first terminal of the fifth resistor R4, a second terminal of the fifth resistor R4 is grounded. The optocoupler Oc has a first input terminal, a second input terminal, a first output terminal, and a second output terminal. The first input terminal of the optocoupler Oc connects to a second terminal of the sixth resistor R5, the second input terminal of the optocoupler Oc connects to a cathode of the second voltage source TL431, the first output terminal of the optocoupler Oc connects to the secondary feedback terminal 401 of the integrated circuit 10, the second output terminal of the optocoupler Oc is grounded, an anode of the second voltage source TL431 is grounded, and a reference pole of the second voltage source TL431 connects to the first terminal of the fifth resistor R4. It should be explained that, the four resistor R3 and the fifth resistor R4 are used to divide the output voltage Vout of the switch power supply, the sixth resistor R5 is used to limit an input current of the optocoupler Oc. Each of the four resistor R3, the fifth resistor R4 and the sixth resistor R5 has a large resistance, thus ensuring a low loss of the switch power supply in the secondary voltage control mode. In addition, the secondary feedback current DET generated by the secondary feedback comparing module 3 is a digital signal such that a working current of the optocoupler Oc can be low to keep the secondary feedback comparing module 3 working, and the power consumption in the secondary constant voltage control mode can be greatly reduced.

As shown in FIG. 8, a working principle of performing a constant voltage control by the switch power supply is as follows. The alternating current voltage Vin is rectified and filtered by the primary rectifier filtering module 8 to obtain the primary direct current voltage. The primary direct current voltage is used to charge a first capacitor C1 via a seventh resistor R6 of the starting module 6, the first capacitor C1 outputs the working voltage to the power supply terminal 801 of the integrated circuit 10. The switch module 4 further includes a switch tube T0, the integrated circuit 10 outputs the driving signal DRV via the signal output terminal 601 to turn on or off the switch tube T0 to control energy of the transformer 1 to be stored or released and adjust the output voltage Vout of the switch power supply to be a rated value under a certain load.

Specifically, if the switch tube T0 is turned on, the primary winding L1 is turned on, the transformer 1 stores energy. A eighth resistor R7 of the overcurrent feedback module 7 induces a current of the primary winding L1 to generate the primary side overcurrent voltage signal and output the primary side overcurrent voltage signal to the overcurrent terminal 701. The primary side overcurrent voltage signal can reflect the current of the primary winding L1. If the switch tube T0 is turned off, the primary winding L1 is turned off, and the stored energy of the transformer 1 is transferred to the secondary winding L2 and the feedback winding L3. The current of the primary winding L1 can be rectified via a first rectifier diode D1 of the starting module 6, and then the starting module 6 outputs the working voltage to the power supply terminal 801 of the integrated circuit 10. The current of the secondary winding L2 can be rectified by a sixth rectifier diode D6 of the secondary rectifier filter module 9 and filtered by a fourth capacitor C4 of the secondary rectifier filter module 9, and then the secondary rectifier filter module 9 outputs the output voltage Vout to an external load. Furthermore, if the working voltage of the power supply terminal 801 of the integrated circuit 10 reaches a starting voltage, the hysteresis starting module 800 outputs a hysteresis voltage signal to control other modules in the integrated circuit 10. At the same time, the reference and bias module 900 outputs the bias signal, the predetermined reference voltage Vref, the first reference voltage V1, the second reference voltage V2 and the third reference voltage V3.

Specifically, if the switch tube T0 is turned off, the integrated circuit 10 take a sample of the primary feedback voltage FB of the primary feedback dividing module 2 via the primary feedback terminal 101, and the primary feedback sampling module 100 obtains the primary feedback voltage FB to generate the primary sampling voltage. If the switch power supply is in a normal load or heavy load situation, the error between the primary sampling voltage and the predetermined reference voltage Vref is amplified by the error amplifying module 200 to generate the error amplified signal EAO. When the error amplified signal EAO is greater than the second reference voltage V2, the integrated circuit 10 works in the primary constant voltage control mode, the first control module 300 performs the pulse width modulation PWM or/and the pulse frequency modulation PFM according to the error amplified signal EAO to output the constant voltage control signal configured to adjust a duty cycle and a working frequency of the drive signal DRV. In addition, the integrated circuit 10 takes a sample of the primary side overcurrent voltage signal generated by the overcurrent feedback module 7 via the overcurrent terminal 701, the overcurrent protection module 700 generates a closing signal according to the primary side overcurrent voltage signal. At this time, the integrated circuit 10 outputs the drive signal DRV according to the constant voltage control signal and the closing signal to switch the switch tube T0 on or off such that the output voltage Vout of the switch power supply may be adjusted to be the rated value under the certain load to achieve the primary constant voltage control. At this time, the reference pole voltage (i.e., a divided voltage obtained by dividing the output voltage Vout of the switch power supply by the fourth resistor R3 and the fifth resistor R4) of the second voltage source TL431 of the secondary feedback comparing module 3 is less than an internal reference voltage ref of the second voltage source TL431 so that the optocoupler Oc is turned off, there is no secondary feedback current DET and the secondary control module 400 do not output the secondary control signal CON.

In addition, if the switch tube T0 is turned off and the switch power supply is in the light load or very light load or even no-load situation, the error between the primary sampling voltage and the predetermined reference voltage Vref is amplified by the error amplifying module 200. If the error amplified signal EAO is less than the first reference voltage V1, the mode selecting unit 402 outputs the secondary mode selection signal EN_SC to control the integrated circuit 10 to enter the secondary constant voltage control mode from the primary constant voltage control mode. After the integrated circuit 10 enters the secondary constant voltage control mode, the switch tube T0 is turned on and the output voltage Vout of the switch power supply increases. The optocoupler Oc is turned on if the reference pole voltage of the second voltage source TL431 of the secondary feedback comparing module 3 is greater than the internal reference voltage ref of the second voltage source TL431. The secondary feedback comparing module 3 outputs the secondary feedback current DET to the secondary feedback terminal 401 and the level of the secondary feedback terminal 401 is changed from high to low. At this time, the detecting unit 403 generates the logic voltage signal BURST according to the level of the secondary feedback terminal 401. After the logic unit 404 receives the secondary mode selection signal EN_SC, the logic unit 404 outputs the secondary control signal CON according the logic voltage signal BURST. Furthermore, the first control module 300 performs the pulse width modulation PWM or/and the pulse frequency modulation PFM according to the error amplified signal EAO to output the constant voltage control signal configured to adjust the duty cycle and the working frequency of the drive signal DRV. The overcurrent terminal 701 takes a sample of the primary side overcurrent voltage signal generated by the overcurrent feedback module 7, the overcurrent protection module 700 generates the closing signal according to the primary side overcurrent voltage signal, and then the integrated circuit 10 controls the level of the drive signal DRV to be a low level to turn off the switch tube T0 according to the secondary control signal CON, the constant voltage control signal and the closing signal. If the switch tube T0 is turned off and the output voltage Vout of the switch power supply is less than the internal reference voltage ref of the second voltage source TL431, the optocoupler Oc is turned off, there is no secondary feedback current DET to the secondary feedback terminal 401 and the level of the secondary feedback terminal 401 is changed from low to the high. At this time, the detecting unit 403 resets the logic voltage signal BURST according to the level of the secondary feedback terminal 401. The logic unit 404 outputs the secondary control signal CON according to the logic voltage signal BURST and the secondary mode selection signal EN_SC, and then the integrated circuit 10 controls the level of the driving signal DRV into a high level to turn on the switch tube T0 according to the secondary control signal CON, the constant voltage control signal and the closing signal so that the output voltage Vout of the switch power supply is maintained as a rated value to achieve the secondary constant voltage control. If the integrated circuit 10 is in the secondary constant voltage control mode, no matter whether the switch tube T0 is on or off, the output voltage Vout of the switch power supply is continuous, and thus there is always a secondary feedback current DET.

Figure 9:
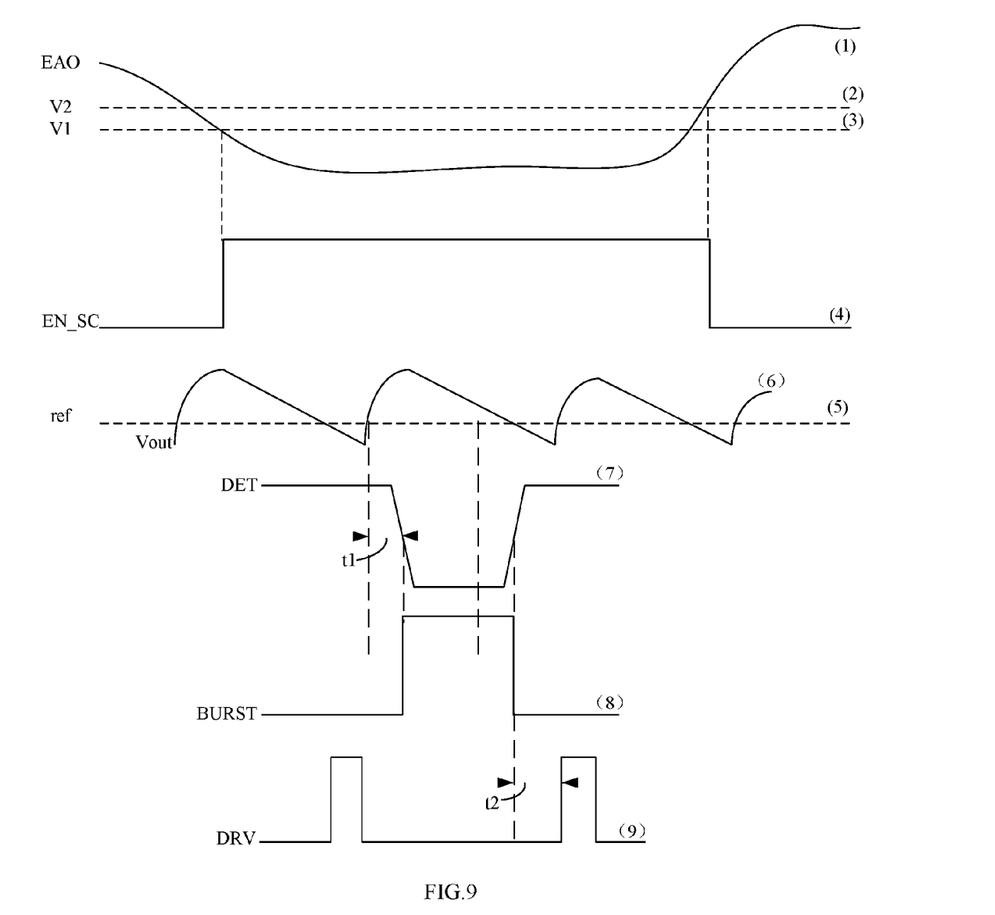
FIG. 9 is a time sequence diagram illustrating an operation logic of a switch power supply according to examples.

FIG. 9 is a time sequence diagram illustrating time sequences of signals in a control process of a switch power supply according to an example. As shown in FIG. 9, (1) is a work time sequence of the error amplified signal EAO, (2) is the second reference voltage V2, (3) is the first reference voltage V1, (4) is a work time sequence of the secondary mode selection signal EN_SC, (5) is the reference pole voltage of the second voltage source TL431, (6) is the output voltage Vout of the switch power supply, (7) is a work time sequence of the secondary feedback current DET, (8) is a work time sequence of the logic voltage signal BURST, and (9) is a work time sequence of the driving signal DRV. Generally, t1 is a delay between an input signal of the optocoupler Oc and an output signal of the optocoupler Oc. t2 is a delay of an oscillator of the integrated circuit 10.

With our switch power supplies, the secondary control module 400 can control the integrated circuit 10 to enter the secondary constant voltage control mode if the integrated circuit 10 is in the a light load or no-load situation, and control the integrated circuit 10 to enter the primary constant voltage control mode if the integrated circuit is in a normal load or heavy load situation. Thus, a mixture control mode including the primary constant voltage control mode and the secondary constant voltage control mode may be realized in a full load situation. The integrated circuit 10 plays an advantage of the primary constant voltage control mode and the secondary constant voltage control mode to obtain a better performance on the dynamic load response, a very low no-load working frequency and a very low no-load loss and to work stably.

Any procedure or method described in the flow charts or described in any other way herein may be understood to comprise one or more modules, portions or parts to store executable codes that realize particular logic functions or procedures. Moreover, advantageous examples comprise other implementations in which the order of execution is different from that depicted or discussed, including executing functions in a substantially simultaneous manner or in an opposite order according to the related functions. This should be understood by those skilled in the art which examples belong to.

The logic and/or step described in other manners herein or shown in the flow chart, for example, a particular sequence table of executable instructions to realize the logical function may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment.

It is understood that each part of this disclosure may be realized by the hardware, software, firmware or their combination. In the above examples, a plurality of steps or methods may be realized by the software or firmware stored in the memory and executed by the appropriate instruction execution system. For example, if it is realized by the hardware, likewise in another example, the steps or methods may be realized by one or a combination of the following techniques known in the art: a discrete logic circuit having a logic gate circuit to realize a logic function of a data signal, an application-specific integrated circuit having an appropriate combination logic gate circuit, a programmable gate array (PGA), a field programmable gate array (FPGA) and the like.

Those skilled in the art shall understand that all or parts of the steps in the above exemplifying method may be achieved by commanding the related hardware with programs. The programs may be stored in a computer readable storage medium, and the programs comprise one or a combination of the steps in the method examples when run on a computer.

In addition, each function cell of the examples may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD and the like.

Reference throughout this specification to "an embodiment," "some embodiments," "one embodiment," "another example," "an example," "a specific example," or "some examples," means that a particular feature, structure, material, or characteristic described in connection with the embodiment or example is included in at least one example. Thus, the appearances of the phrases such as "in some embodiments," "in one embodiment," "in an embodiment," "in another example," "in an example," "in a specific example," or "in some examples," in various places throughout this specification are not necessarily referring to the same example. Furthermore, the particular features, structures, materials, or characteristics may be combined in any suitable manner in one or more examples.

Although examples have been shown and described, it would be appreciated by those skilled in the art that the above examples cannot be construed to limit the disclosure and changes, alternatives, and modifications can be made in the examples without departing from spirit, principles and scope of the disclosure.

What is claimed is:

1. An integrated circuit that controls a switch power supply comprising:
   a primary feedback terminal configured to receive a primary feedback voltage of the switch power supply;
   a primary feedback sampling module connected to the primary feedback terminal and configured to take a sample of the primary feedback voltage to generate a primary sampling voltage;
   an error amplifying module connected to the primary feedback sampling module and configured to amplify an error between the primary sampling voltage and a predetermined reference voltage to generate an error amplified signal;
   a first control module connected to the error amplifying module and configured to perform a pulse width modulation or/and a pulse frequency modulation according to the error amplified signal to generate a constant voltage control signal;
   a secondary feedback terminal configured to receive a secondary feedback current of the switch power supply;
   a secondary control module connected to the secondary feedback terminal and the error amplifying module, respectively, and configured to control the integrated circuit to enter a control mode comprising a primary constant voltage control mode and a secondary constant voltage control mode according to the error amplified signal and generate a secondary control signal according to the secondary feedback current if the integrated circuit is in the secondary constant voltage control mode;
   a second control module connected to the first control module and the secondary control module, respectively, and configured to generate a logic control signal according to the constant voltage control signal, or according to the secondary control signal and the constant voltage control signal; and
   a driving module connected to the second control module and configured to generate a driving signal according to the logic control signal and to output the driving signal.

2. The integrated circuit of claim 1, wherein the secondary control module comprises:
   a mode selecting unit connected to the error amplifying module and configured to output a secondary mode selection signal to control the integrated circuit to enter the secondary constant voltage control mode if the error amplified signal is less than a first reference voltage;
   a detecting unit connected to the secondary feedback terminal and a first voltage source of the integrated circuit, respectively, and configured to take a sample of the secondary feedback current and generate a logic voltage signal according to an output voltage of the first voltage source and the secondary feedback current; and
   a logic unit connected to the mode selecting unit and the detecting unit, respectively, and configured to generate the secondary control signal according to the logic voltage signal and the secondary mode selection signal.

3. The integrated circuit of claim 2, wherein the mode selecting unit comprises:
   a selector connected to the first reference voltage, the second reference voltage and a first inversion signal, respectively, and configured to select the first reference voltage or the second reference voltage to generate a selection signal according to the first inversion signal;
   a hysteresis comparator having an anode connected to the selector and a cathode connected with the error amplifying module and configured to compare the selection signal with the error amplified signal to generate a hysteresis comparison signal;
   a first inverter connected to the hysteresis comparator and configured to invert the hysteresis comparison signal to generate the first inversion signal; and
   an AND gate connected to the first inverter and a predetermined enable signal, respectively, and configured to perform a logical "AND" calculation on the first inversion signal and the predetermined enable signal to output the secondary mode selection signal.

4. The integrated circuit of claim 2, wherein the detecting unit comprises:
   a first resistor having a first terminal connected to the first voltage source of the integrated circuit and a second terminal connected with the secondary feedback terminal;
   a comparator having an anode connected to a third reference voltage and a cathode connected to the second terminal of the first resistor and configured to compare the third reference voltage with a cathode voltage of the comparator to generate a comparison signal;
   a second inverter connected to the comparator and configured to invert the comparison signal to generate a second inversion signal; and
   a third inverter connected to the second inverter and configured to invert the second inversion signal to generate the logic voltage signal.

5. The integrated circuit of claim 2, wherein each of the secondary feedback current, the logic voltage signal, the secondary mode selection signal, and the secondary control signal is a digital signal.

6. The integrated circuit of claim 1, wherein the mode selecting unit is further configured to control the integrated circuit to enter the primary constant voltage control mode if the error amplified signal is greater than a second reference voltage.

7. The integrated circuit of claim 1, wherein the first control module is further configured to generate an overcurrent reference signal according to the error amplified signal.

8. The integrated circuit of claim 7, further comprising:
an overcurrent terminal configured to receive a primary side overcurrent voltage signal of the switch power supply; and
an overcurrent protection module connected to the first control module, the overcurrent terminal and the second control module, respectively, and configured to compare the overcurrent reference signal with the primary side overcurrent voltage signal to generate a closing signal.

9. The integrated circuit of claim 8, wherein the second control module is further configured to generate the logic control signal according to the secondary control signal, the closing signal and the constant voltage control signal, or according to the closing signal and the constant voltage control signal.

10. The integrated circuit of claim 1, further comprising:
a power supply terminal configured to receive a working voltage of the integrated circuit;
a hysteresis starting module connected to the power supply terminal and configured to generate a hysteresis voltage signal according to the working voltage; and
a reference and bias module connected to the power supply terminal and the hysteresis starting module, respectively, and configured to generate a bias signal, the predetermined reference voltage, the first reference voltage, the second reference voltage and the third reference voltage according to the hysteresis voltage signal.

11. A switch power supply comprising:
a transformer comprising a primary winding, a secondary winding and a feedback winding;
a primary feedback dividing module connected to the feedback winding and configured to generate a primary feedback voltage according to a feedback voltage of the feedback winding;
a secondary feedback comparing module connected to an output voltage of the switch power supply and configured to generate a secondary feedback current according to the output voltage of the switch power supply;
a switch module having a first terminal, a second terminal and a control terminal, wherein the first terminal of the switch module connects to the primary winding; and
the integrated circuit according to claim 1, wherein a primary feedback terminal of the integrated circuit connects to the primary feedback dividing module, a secondary feedback terminal of the integrated circuit connects to the secondary feedback comparing module, a signal output terminal of the integrated circuit connects to the control terminal of the switch module, the integrated circuit is configured to switch the switch module on or off according the primary feedback voltage and the secondary feedback current to adjust the output voltage of the switch power supply.

12. The switch power supply of claim 11, further comprising:
a starting module connected to the primary winding, the feedback winding and the integrated circuit, respectively, and configured to generate a starting voltage to control the integrated circuit to start to work according to an input voltage of the primary winding and the feedback voltage of the feedback winding; and
an overcurrent feedback module having a first terminal and a second terminal, wherein the first terminal of the overcurrent feedback module connects to the second terminal of the switch module and an overcurrent terminal of the integrated circuit, respectively, the second terminal of the overcurrent feedback module is grounded, and the overcurrent feedback module is configured to generate a primary side overcurrent voltage signal according to an output signal of the switch module and output the primary side overcurrent voltage signal to the overcurrent terminal of the integrated circuit.

13. The switch power supply of claim 11, further comprising:
a primary rectifier filtering module connected to an alternating current voltage, the primary winding and the feedback winding, respectively, and configured to rectify and filter the alternating current voltage to generate a primary direct current voltage and output the primary direct current voltage to the primary winding and the feedback winding, respectively; and
a secondary rectifier filtering module connected to the secondary winding, and configured to rectify and filter a secondary voltage of the secondary winding to generate the output voltage of the switch power supply.

14. The switch power supply of claim 11, wherein the primary feedback dividing module comprises a second resistor and a third resistor, a first terminal of the second resistor connects to the feedback winding, a second terminal of the second resistor connects to a first terminal of the third resistor and a power supply terminal of the integrated circuit, respectively, and a second terminal of the third resistor is grounded.

15. The switch power supply of claim 11, wherein the secondary feedback comparing module comprises a fourth resistor, a fifth resistor, a fifth resistor, a second voltage source having a cathode, an anode and a reference pole, and an optocoupler having a first input terminal, a second input terminal, a first output terminal and a second output terminal;
a first terminal of the fourth resistor connects to a high level end of the output voltage of the switch power supply and a first terminal of the sixth resistor, respectively, a second terminal of the fourth resistor connects to a first terminal of the fifth resistor, a second terminal of the fifth resistor is grounded, a second terminal of the sixth resistor connects to the first input terminal of the optocoupler, the second input terminal connects to the cathode of second voltage source, the first output terminal of the optocoupler connects to the secondary feedback terminal of the integrated circuit, the second output terminal of the optocoupler is grounded, the reference pole of the second voltage resource connects to the first terminal of the fifth resistor and the anode of the second voltage resource is grounded.

* * * * *